United States Patent
Freudelsperger

[11] Patent Number: 6,142,336
[45] Date of Patent: Nov. 7, 2000

[54] STORAGE SHELVING

[75] Inventor: Karl Freudelsperger, Hart bei Graz, Austria

[73] Assignee: Knapp Logistik Automation Gesellschaft mbH, Hart bie Graz, Austria

[21] Appl. No.: 09/284,847
[22] PCT Filed: Oct. 24, 1997
[86] PCT No.: PCT/AT97/00228
§ 371 Date: Jun. 21, 1999
§ 102(e) Date: Jun. 21, 1999
[87] PCT Pub. No.: WO98/18696
PCT Pub. Date: May 7, 1998

[30] Foreign Application Priority Data

Oct. 25, 1996 [AT] Austria ................................ 1875/96

[51] Int. Cl.$^7$ .................................................. B65G 59/00
[52] U.S. Cl. ........................................... 221/130; 221/268
[58] Field of Search ..................................... 221/130, 131, 221/133, 129, 268, 195, 276; 414/797.9

[56] References Cited

U.S. PATENT DOCUMENTS 3,624,792 11/1971 Lipfert .
5,065,897 11/1991 Smith .
5,439,345 8/1995 Ivo .

FOREIGN PATENT DOCUMENTS

0 611 265 8/1994 European Pat. Off. .
0 683 116 11/1995 European Pat. Off. .

*Primary Examiner*—Kenneth W. Noland
*Attorney, Agent, or Firm*—Sughrue, Mion, Zinn, Macpeak & Seas, PLLC

[57] ABSTRACT

A storage shelving (1) for piece goods has storage compartments (5) arranged both next to and stacked one above the other and is equipped with a controllable device for dispensing the piece goods by pushing them out the storage compartments (5). Cross members (10), which are movable parallel to the bottoms of the storage compartments (5), are associated with the adjacent rows of storage compartments (5). The cross members have separately actutable drivers (13) which are associated with the individual storage compartments (5) of the corresponding row. When in the actuated position, the drivers (13) push the piece goods out of the storage compartments (5). To reduce the number of drive devices of the dispensing device, the cross members (10) are attached to a common support frame (25) and can be moved together with the aid of this support frame (25).

19 Claims, 5 Drawing Sheets

STORAGE SHELVING

The invention relates to a storage shelf for items, said storage shelf comprising adjacently arranged and superposed storage compartments and a controllable dispensing device for shifting the items out of the storage compartments, the dispensing device including cross members associated to the rows of adjacently arranged storage compartments and movable in parallel to the compartment bottoms thereof, the cross members cooperating with separately activatable drivers associated to the individual storage compartments of the respective row so as to shift the items out of the respective storage compartments in the activated state of the drivers, when the cross members are moved forwards. The items may be contained in the storage compartments in vertical stacks, yet also in horizontal stacks.

Furthermore, the invention relates to an arrangement comprising several such storage shelves.

From U.S. Pat. No. 4,267,942 A, a pharmaceutical dispensing cabinet is known, wherein storage cubicles for prepackaged pharmaceuticals are provided in horizontal and vertical rows, wherein for each storage cubicle a probe is provided for pushing out the pharmaceutical packages, which probe is mounted behind the respective storage cubicle in a bushing and is capable of pushing out each lowermost pharmaceutical package of the vertical package stacks present in the storage cubicle. To perceive probe activations, spring-actuated pivot vanes are provided in the path of the probe behind the storage cubicles. The probe activation is provided so as to otherwise prevent access to the pharmaceutical packages in the cabinet. This known construction thus is comparatively complicated and hardly suitable for commissioning systems.

On the other hand, commissioning systems have become known in many instances, in which items are dispensed under computer control from storage compartments (often also termed channels, magazines or storage containers) of storage shelves, for which purpose the most varying ejectors, one for each storage compartment, had been provided, constituting a considerable expenditure, cf., e.g., EP 26,754 A, EP 165,918 A, EP 515,350 B, yet also EP 560,206 A or EP 592,729; in such systems, the items as a rule are automatically put onto a conveying belt, depending on the commissioning order, optionally with a previous intermediate storage (cf., e.g., AT 391,671 B), and from this conveying belt they are transported to a transfer station, to a further conveying belt (cf. e.g., EP 183,074), or to a packaging region.

A storage shelf of the initially defined type is known from U.S. Pat. No. 5,439,345 A. In detail, two steep, slantedly abutting storage shelves are provided in an A-arrangement in whose storage compartments the items are superposed in stacks. To eject the lowermost items, cross members provided with a common drive are provided to which a driver in the form of a cuboid-shaped ejector for each item stack can become attached via a solenoid if the solenoid is activated. The common drive of the cross members is effected by a drivable disk arranged between the storage shelves, the drivable disk comprising excentrically arranged grooves on either side, each groove guiding one end of a two-armed rocking lever whose other end is connected with the cross member. It is also provided that always two superposed rows of adjacent storage compartments are mounted in the storage shelves, a further disk being required for the drive. The known construction is relatively complex, complicated and thus susceptible to failure, in particular if the number of superposed compartment rows were increased.

The invention aims at providing a storage shelf of the initially defined type, in which the expenditures for the dispensing device including its drive are as low as possible and an efficient dispensing procedure is enabled by parallel shift-out actions, also under the control of a computer, and which optionally can be used for the most diverse commissioning systems according to the prior art (e.g. as indicated above).

According to the invention, this object is achieved in that the cross members are attached to a common, drivable support frame and thus are movable in common by aid of this support frame.

Instead of one individual driving device per row of adjacent storage compartments, thus with the present storage shelf the arrangement is structurally simple in an advantageous manner, with a total of only one driving device being required per storage shelf. To shift out stored items of only some selected storage compartments in random rows, the respective drivers on the cross members of the support frame are activated, preferably under the control of a computer; where the drivers are not activated, no items will be shifted out. A further advantage consists in that the drivers may also be attached to the cross members so as to be detachable therefrom or movable, in particular movable along the cross members, so as to enable an adaptation to the storage compartments—if the latter are defined by adjustable partition walls. By the simultaneous occurrence of the shift-out operations by aid of the cross members simultaneously moved via the support frame, time is saved, and a large number of items can be ejected simultaneously; the shift-out actions are also repeatable in rapid succession so that commissioning orders can be filled within a short time.

In a preferred simple embodiment of the support frame it is advantageous if the cross members are interconnected via lateral ledges to form the support frame.

According to an advantageous embodiment with smooth running cross members it is provided for the cross members to be displaceably mounted, via rollers attached to their ends, in guide rails on a framework of the storage shelf.

The cross members may also be drivable in common, by the support frame, by at least one (pneumatic or hydraulic) working cylinder.

For a mechanically simple, space-saving construction of the driving device it is furthermore suitable if the support frame, preferably in the region of the uppermost and lowermost cross members, is connected with chain drives the chain wheels of which being mounted in a framework of the storage shelf via shafts, the shafts being synchronously drivable preferably by a single motor. Via catch pins or the like which engage in the chain(s), the support frame may, in a manner known per se, in this instance be coupled with the chain drive for forward and rearward movements.

In the embodiments explained before, the cross members, if they carry the drivers directly, move forwards and rearwards between the superposed storage compartment rows, and since they are interconnected to a unit via the support frame, the bottoms of the storage compartment can be fixed at the front side of the shelf (i.e. at the delivery side) and can cantelever freely towards the rear side so that the vertical lateral beams or struts can move along on the shelf. In any event, this is without any problems if the stored items are not too heavy; optionally, the bottoms may also be provided with ribs, webs etc. (preferably on their lower side) for stiffening purposes. On the other hand, with this embodiment a slight shelf depth is possible, since practically the entire shift-out unit (support frame, cross member) can move forwards and rearwards within the shelf depth required for the storage compartments.

If, on the other hand, there is sufficient space behind the storage compartments, at the rear side of the shelf, it may be particularly advantageous—to also enable supporting of the compartment bottoms at the shelf sides, if the cross members are fastened to the ends of arms projecting from the support frame in the movement direction thereof, wherein preferably at least some of these arms, via rollers, are mounted in lateral guide rails which are fastened in a framework of the storage shelf.

To avoid canting, here it is also suitable for the drive if toothed ledges are provided on at least two arms which mesh with toothed wheels which are fastened on a common shaft that is mounted in the framework and connected with a driving device, preferably one common motor.

According to a further advantageous embodiment of the storage shelf of the invention it is provided for the drivers to be connected with the cross members via arms, and for additional arms to be arranged on the support frame which carry rollers at their ends, the rollers being mounted in guide rails on a framework of the storage shelf. In this embodiment, the arms individually project from the rear into the storage compartments when the support frame is moved forwards.

Here, it is also suitable if the support frame, e.g. at approximately the middle of its height, is connected with working cylinders fastened to the framework. Preferably, pneumatic cylinders are used.

On the other hand, for a smooth working construction, it is also advantageous if the cross members of the support frame define carriages with wheels running in lateral guides.

Here it has proven suitable if at least the uppermost and the lowermost carriage which are associated to one row each of adjacent storage compartments are coupled with a crank disk via a connecting rod whose shaft is mounted in a framework of the storage shelf.

Here, it is furthermore suitable for the synchronous drive if the crank disks of all carriages are coupled one to each other by toothed belts and driven via one driving device.

It has also proven to be advantageous if the guides and the storage compartments are arranged to be downwardly inclined in the shift-out direction. This facilitates shifting out of the items in an advantageous manner.

It is also particularly advantageous if on at least one cross member, preferably on each cross member, in the region of at least one driver, a sensor monitoring the shift-out operation at the associated storage compartment is arranged which advantageously also senses whether the storage compartment contains items or is empty. These sensors thus not only monitor the shift-out procedure, much rather they can fulfill a double function by monitoring also the state of filling of the storage compartments which is aided by the fact that they are movable, since they are arranged on the cross members. The sensors may, e.g., be mechanical sensors, e.g. microswitches, preferably, however, optical sensors are used which may, e.g., be based on reflection light measurement or may be formed by photoelectric barriers.

A further structurally advantageous embodiment consists in that in their activated state, the drivers project upwardly from their cross members movable below the bottoms of the storage compartments, through slots in the bottoms, while they are present below the bottoms in the non-activated state. The drivers may be pushed out via separate drives, e.g. by rack and pinion gears. In a preferred embodiment of the drivers, however, it is provided for the drivers to be formed or driven, respectively, by extendable magnetic cores of solenoids arranged on the cross members.

Like earlier storage shelves, the present storage shelves may be inserted into computer-controlled commissioning systems, the present storage shelves may, e.g., be particularly suitable for so-called "slowly rotating" items, since a simplified dispensing device and driving means proves to be particularly suitable therefor. In this connection, the invention also provides for a particularly advantageous storage shelf arrangement with a simplified driving device which is characterized in that (as known per se) on either side of a conveying belt, opposite storage shelves are provided and the carriages of opposite storage shelves are driven via associated connecting rods by a common crank disk arranged between the storage shelves.

The invention will now be explained in more detail by way of exemplary embodiments illustrated in the drawings to which, however, it shall not be restricted.

Figure 1:
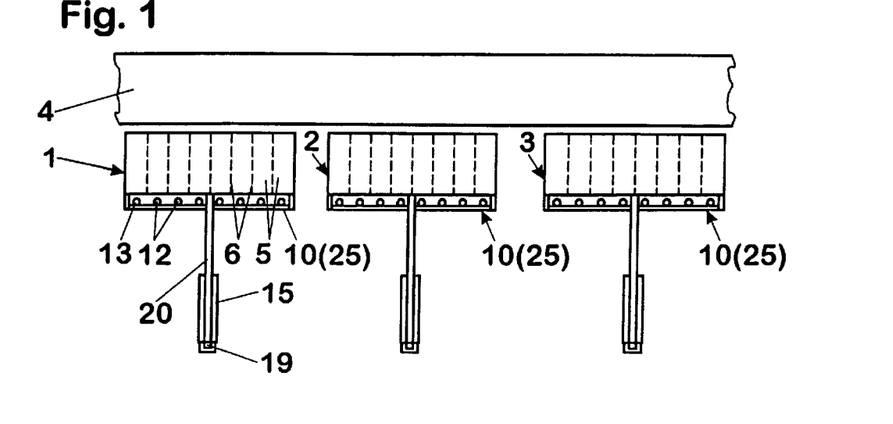
FIG. 1 shows a schematically illustrated top view of commissioning storage shelves (shortly termed storage shelves hereinafter) set up adjacent a conveying belt.

According to FIG. 1, storage shelves 1, 2 and 3 are arranged adjacent a conveying belt 4 so as to form a commissioning system for items of various types, e.g. for pharmaceutical products or for tobacco products.

Figure 2:
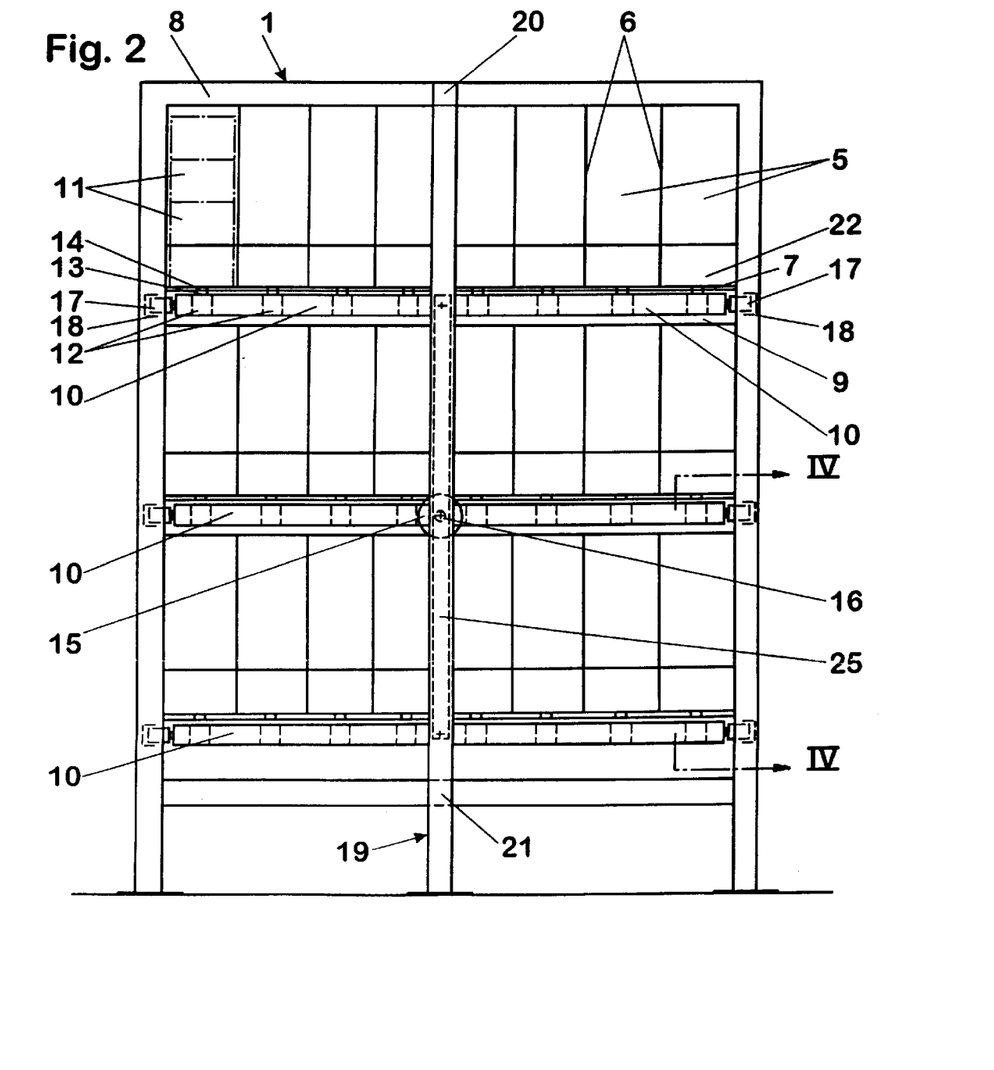
FIG. 2 shows a rear view of one of the storage shelves according to FIG. 1, wherein the general storage shelf structure is illustrated and the support frame is not visible in detail.
Figure 3:
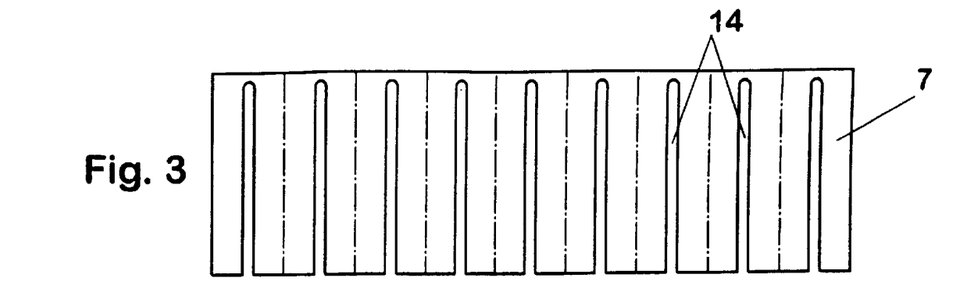
FIG. 3 shows a top view of a bottom of a storage compartment used in the storage shelf according to FIG. 2.
Figure 4:
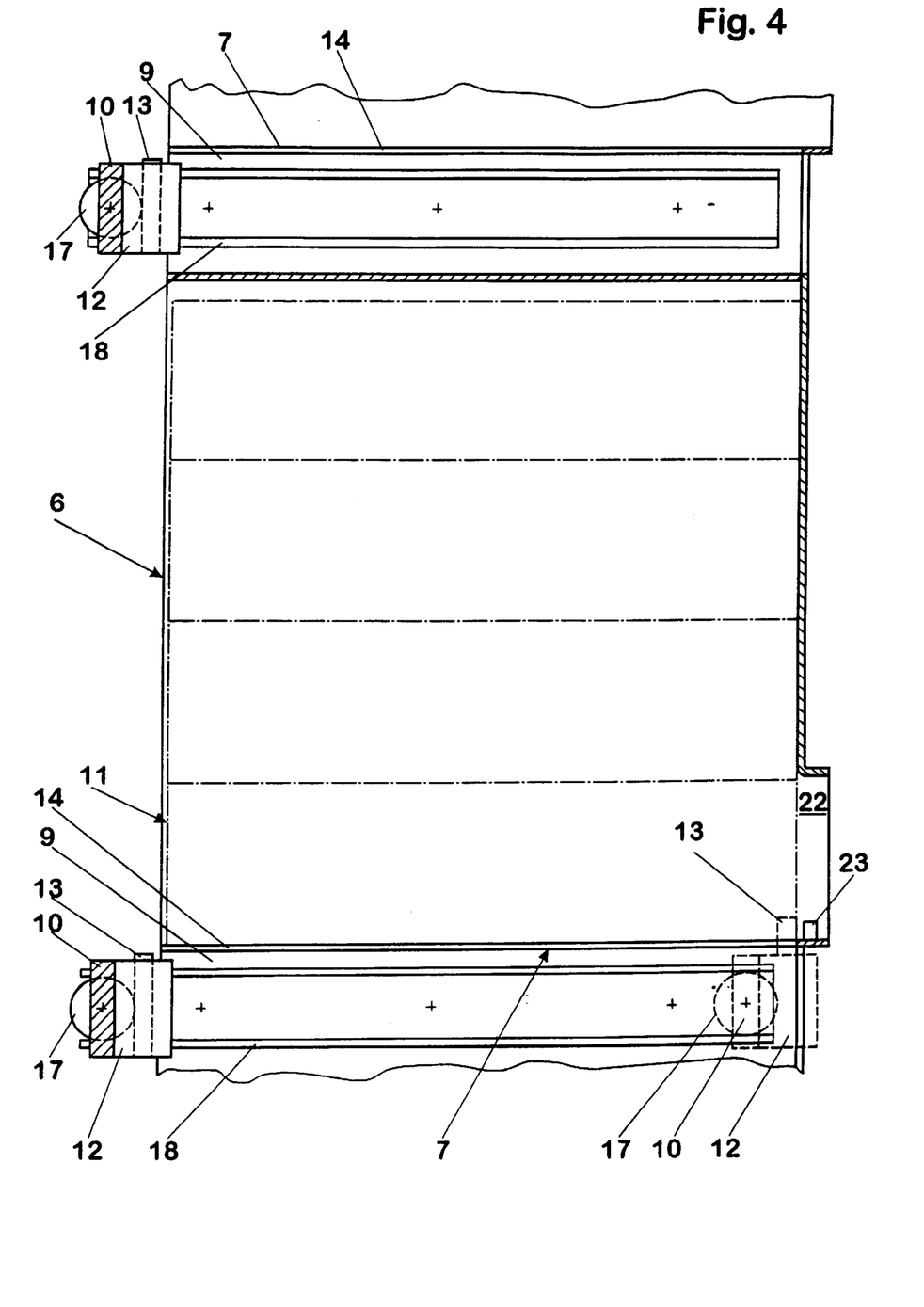
FIG. 4 shows a detail of the storage shelf according to FIG. 2 in a section along line IV—IV of FIG. 2.

Each storage shelf, e.g. 1, has storage compartments 5 in adjacent and superposed arrangement which are laterally separated from each other by partition walls 6 and at their lower side have a common plate-shaped bottom 7 illustrated in FIG. 3. The storage compartments 5 formed in this manner are arranged in a framework 8. The superposed rows of storage compartments 5 are arranged in spaced relationship, i.e. the upper sides of the partition walls 6 end at a distance below the bottoms 7 such that an intermediate space 9 extending over the entire width of the respective horizontal row of the storage compartments 5 is formed between each bottom plate 7 and the upper rim of the partition walls 6 which serves for inserting cross members 10 of a support frame 25, which cross members 10 define a dispensing device (cf. FIGS. 5 to 12), for shifting items 11 present in the storage compartments 5 in the respective lowermost position of vertical stacks out of the storage compartments 5 in the direction to the front or dispensing side, towards the conveying belt 4 (cf. FIG. 1). The cross members 10 carry, e.g., displaceable solenoids 12 associated with the individual storage compartments 5, the rod-shaped cores thereof projecting upwards so as to form drivers 13 for the lowermost items 11. The cross members 10 of the support frame 25 are movable in a direction towards the front side and back from the front side. In the activated state of the solenoids 12, the cores thereof are moved upwards as catches 13, and by projecting through longitudinal slots 14 in the bottoms 7 (cf. FIG. 3) into the respective storage compartment 5 they can abut at the rear side of the respective lowermost item-11 and push the same forwards towards the dispensing side or conveying belt 4, respectively, if the support frame 25 is set into forward motion. For this purpose, a drive device in form of pneumatic or hydraulic double-active operating cylinders 15 is provided in the embodiment according to FIG. 1, wherein each support frame 25 has an associated cylinder 15, as is also schematically shown in FIG. 2. In detail, the respective support frame 25 may be screwed to the associated piston rod 16. The lateral ends of the cross members 10 are each displaceably mounted via a roller 17 in C-shaped guide rails 18 which are fastened in the framework 8.

From FIGS. 1 and 2 it is furthermore apparent that the free ends of the cylinders 15 are fastened to an upright 19 which is connected with the framework 8 via an upper and a lower horizontal transverse strut 20, 21.

Actuation of the cylinders 15 and of the solenoids 12 is effected computer-controlled in a per se conventional manner (not illustrated).

To shift out an item from one or several of the storage compartments 5, via a discharge opening 22 (cf. FIG. 4) at the front side of the shelf, the respective solenoids 12 and the cylinders 15 of the corresponding storage shelves 1, 2, 3 are activated. Via a sensor 23 arranged at the discharge opening, e.g. a light barrier or a micro-switch, the complete shifting out of the respective item 11 can be sensed, whereupon the solenoid(s) 12 are deactivated, and subsequently the cylinder(s) 15 on the other side are pressurized so that the support frame 25 and thus the cross members 10 with the solenoids 12 return from the forward end position illustrated at the right-hand side in FIG. 4 in broken line into the rear starting position illustrated at the left-hand side.

Instead of a pressure cylinder drive it is, of course, also possible to provide a different drive for the support frame 25, such as a chain or rope drive or crank disk drive capable of being integrated in the framework 8, cf. also the following description of further exemplary embodiments. What is essential is that via the support frame 25, in each storage shelf all the cross members 10 and thus all the solenoids 12 are simultaneously movable in the direction towards the conveying belt 4, wherein basically merely one driving device is required.

Figure 5:
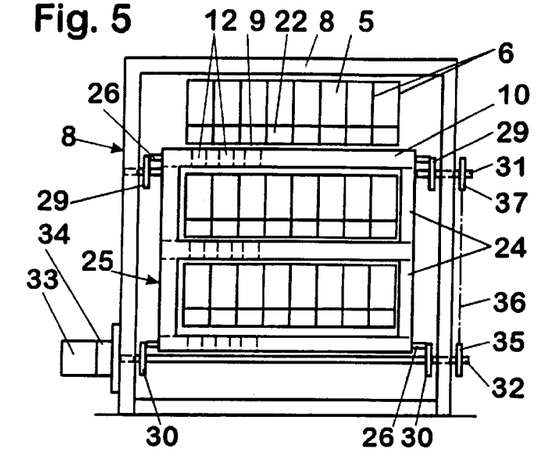
FIGS. 5 to 10 show three further embodiments of storage shelves, each in schematical rear view and side view.
Figure 6:
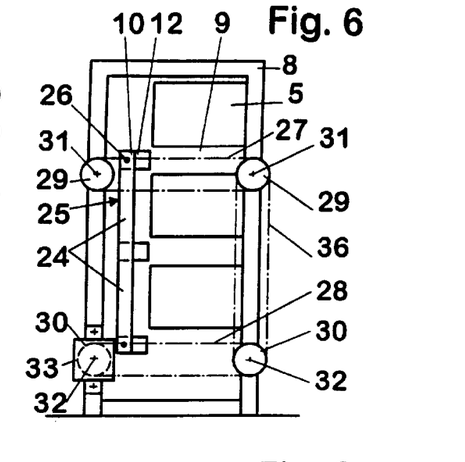

In the embodiment according to FIGS. 5 and 6, the cross members 10 are connected by means of lateral beams or struts 24 into a uniform support frame 25 for the solenoids 12. In extension of these cross members 10, catch pins 26 project from the lateral ends of the uppermost and lowermost cross members 10 and are connected with one element of the upper chain 27 or of the lower chain 28, respectively; these chains 27, 28 have associated pairs of chain wheels 29, 30 which are mounted in the framework 8 via upper and lower shafts 31, 32. One of the lower shafts 32 is connected with a drive motor 33 fastened to the framework 8 by means of a gear 34, whereas the other lower shaft 32 comprises an additional chain wheel 35 which is in driving connection with an additional chain wheel 37 on one of the upper shafts 31 via a chain 36, so that when the drive motor 33 is activated or turned on, the chain wheels 29, 30, 35 and 37 are rotated simultaneously and thus the frame 25 including the solenoids 12 is driven uniformly. By changing the rotational direction of the drive motor 33, also the direction of movement of the support frame 25 is reversed accordingly.

In the embodiment according to FIGS. 5 and 6, the storage compartments 5 are fastened to the front wall of the framework 8 in the manner of a cantelevering console so that the movement of the support frame 25 or of its cross members 10 and lateral beams 24, respectively, in the intermediate spaces 9 as well as laterally of the end-side storage compartments 5 is not impeded. The rear sides of the storage compartments 5 may be designed to be open over the entire compartment height so as to facilitate the filling thereof with the items 11. With horizontally oriented storage compartments 5, also retaining parts, e.g. flaps or detachable sliding walls, for the items 11 may be provided at the rear sides of the storage compartments 5 to prevent the items 11 from falling out.

Figure 7:
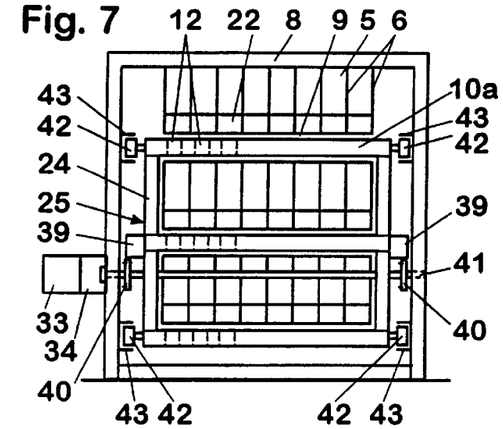
Figure 8:
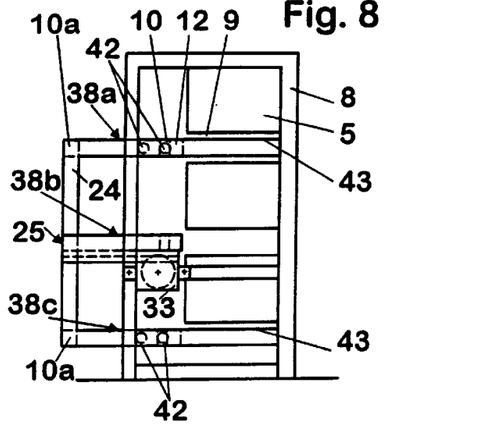

In the exemplary embodiment shown in FIGS. 7 and 8, the cross members 10 are fastened with the solenoids 12 at the ends of two arms 38a, 38b, 38c each projecting forwardly of a support frame 25 which, similar to the exemplary embodiment according to FIGS. 5 and 6, is formed of cross members 10a and vertical lateral beams 24. At the sides of the middle arms 38b, toothed ledges 39 are fastened each meshing with a toothed wheel 40, the toothed wheels 40 in common being fastened on a shaft 41 mounted in the framework 8 and being driven by a drive motor 33 fastened to the framework 8 and comprising a gear 34. At the sides of the uppermost and lowermost arms 38a, 38c, rollers 42 are attached which are displaceably mounted in C-shaped guide rails 43 attached to the framework 8. By activating or turning on the drive motor 33, both toothed ledges 39 and thus the frame/cross member unit—are simultaneously put into motion; again, the direction of movement is reversed by changing the rotational direction of the drive motor 33.

The storage compartments 5, i.e. the bottoms 7 and partition walls 6 thereof, are fastened to the front side of the framework 8, as with the embodiment according to FIGS. 5 and 6, and the storage compartments 5 may be designed to be open at their upper and rear sides.

Figure 9:
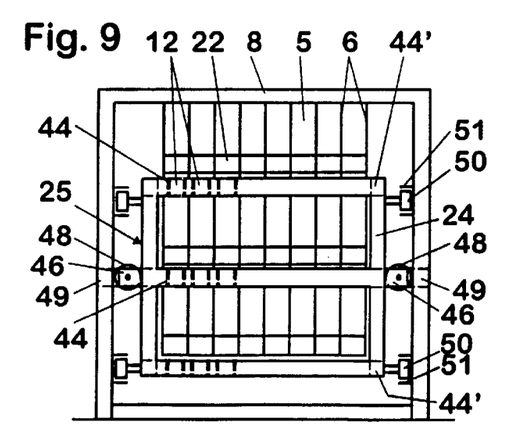
Figure 10:
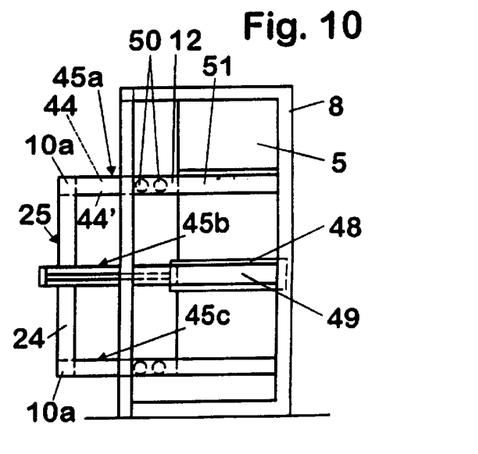

In the embodiment according to FIGS. 9 and 10, the solenoids are each individually fastened to arms 44 projecting finger-like from a support frame 25 formed by cross members 10a and lateral beams 24, which arms form an upper, a middle and a lower arm row 46a, 45b, 45c. At the level of the middle arm row 45b, the support frame 25 is provided with angular projections 46 on either side which are each connected with a piston rod 47 of a pneumatic or hydraulic cylinder 48, the cylinders 48 in turn being fastened to a transverse part 49 of the framework 8. At the four corners of the support frame 25, additional arms 44' are attached each carrying rollers 50 at their end, which rollers 50 are displaceably mounted in C-shaped guide rails 51 on the framework 8. By activating the two cylinders 48, the support frame 25 is directly set into motion.

In this embodiment, the storage compartments 5 can be designed to be closed on all sides except for an opening for inserting the finger-like arms 44, i.e. there need be neither a freely cantilevering bottom nor an intermediate space 9. Optionally, the lateral partition walls, in terms of height, may be designed to be continuous over the superposed storage compartments 5 and the rear sides of the storage compartments may be open, wherein, however, the entire height of the superposed items 11 must be less than the distance between the lower edges of the cross members 10 and the bottoms 7.

Figure 11:
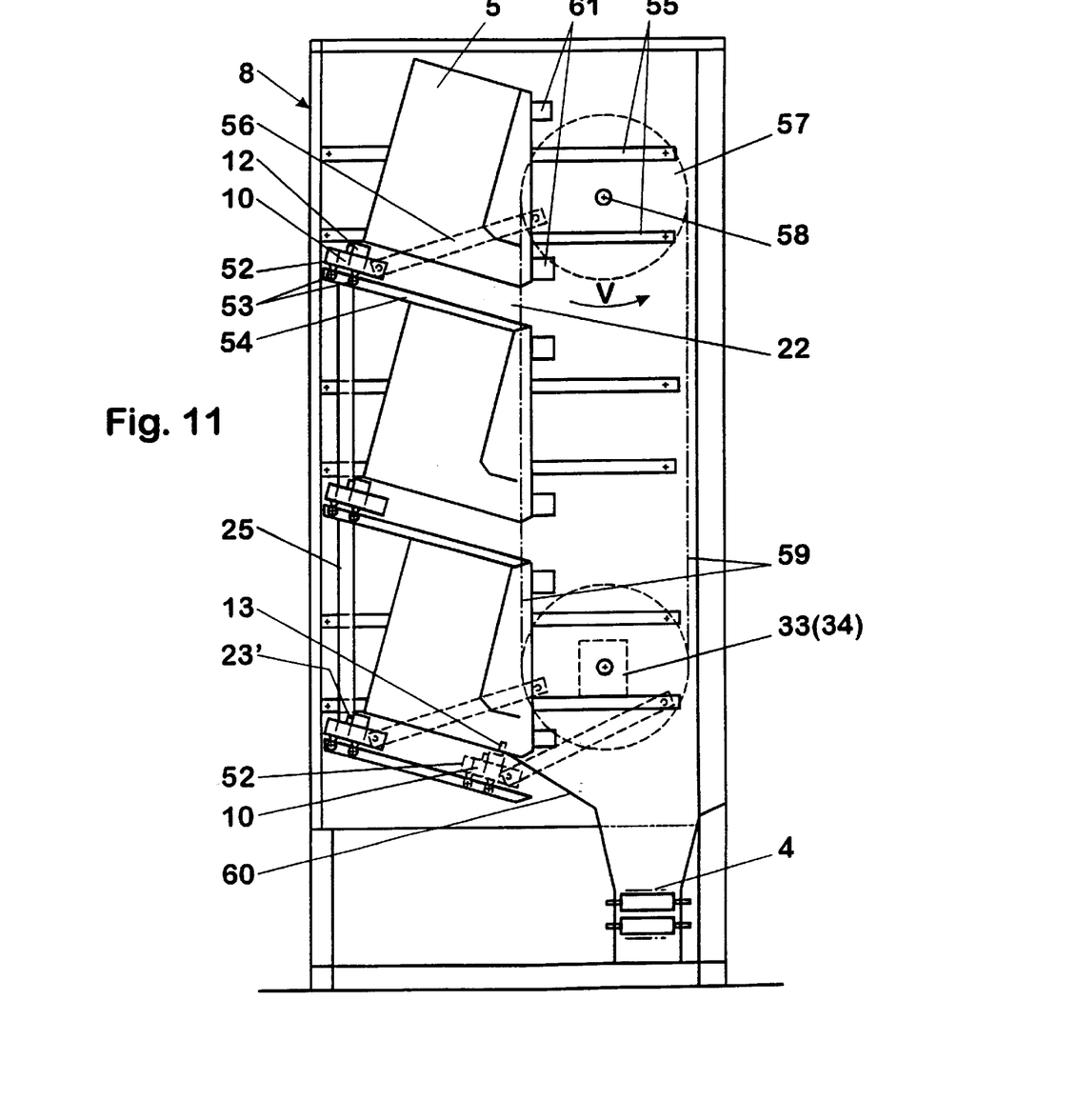
FIG. 11 shows a schematical side view of a particularly preferred embodiment of a storage shelf.

In the embodiment of a storage shelf illustrated in FIG. 11, which is particularly preferred at present, the cross members 10 of the support frame 25 define carriages 52, the two ends of the cross members 10 with the solenoids 12 per storage compartment 5 being each connected with a small sled having wheels 53, which is displaceably guided in a guide rail 54 that is slightly downwardly inclined in the shift-out direction, the guide rail 54 being attached below the likewise slantedly inclined storage compartments 5 adjacently arranged in a row. The storage compartments 5 are, e.g., fastened to lateral ledges 55 of the framework 8. The carriages 52 of each row of storage compartments 5 are coupled via a hinged lateral connecting rod 56 with a crank disk 57, wherein the shafts 58 of the crank disks 57 are mounted in the framework 8 and the crank disks 57 can be coupled among each other, e.g. by toothed belts 59, so that via one drive motor 33 with gear 34, which is, e.g., coupled to the lowermost shaft 58, the cross members 10 or carriages 52 all simultaneously can be set into motion in the direction towards the discharge opening 22, if the crank disks 57 rotate in the direction of the arrow V. At the lowermost storage compartment 5, the carriage 52 or the cross member 10, respectively, is represented with an extended catch 13, illustrated in broken lines, in its end position.

When the items 11 reach the shelf front side, they pass onto a conveying belt 4 via a chute 60.

By reversing the rotational direction of the drive motors 33, the carriages 52 can return to their starting position. Optionally, however—as is preferred—such a reversion of the rotational direction can be omitted, and the return of the cross members 10 is effected simply by further rotating the crank disks 57; accordingly, a first rotation of the crank disks 57 by 180° corresponds to a forward stroke of the cross member 10, and upon rotation by further 180°, the cross members 10 are moved back again.

Behind each one of the solenoids 12, a sensor 23' is arranged on the carriage 52 or cross member, respectively, which may, e.g., be designed as a photoelectric barrier or micro-switch, and which, on the one hand, can monitor the shift-out procedure and, on the other hand, can ascertain whether the respective storage compartment 5 is still filled with items 5 or is already empty.

Similar to the embodiment according to FIGS. 5 and 6, the cross members 10 are interconnected in a support frame 25. For stability purposes, the storage compartments 5 are furthermore fastened with their front sides to section carriers 61 extending transversly to the shift-out direction; for the carriages 52 arranged in the middle, the crank disks 57 including the connection rods 56 are omitted.

As a rule, of course, more than the illustrated three rows of storage compartments 5 are superposed. It is also conceivable to successively stack the items 11 in the storage compartments 5 and shift out one, two ect. items 11 successively by correspondingly activating the catches 13.

Figure 12:
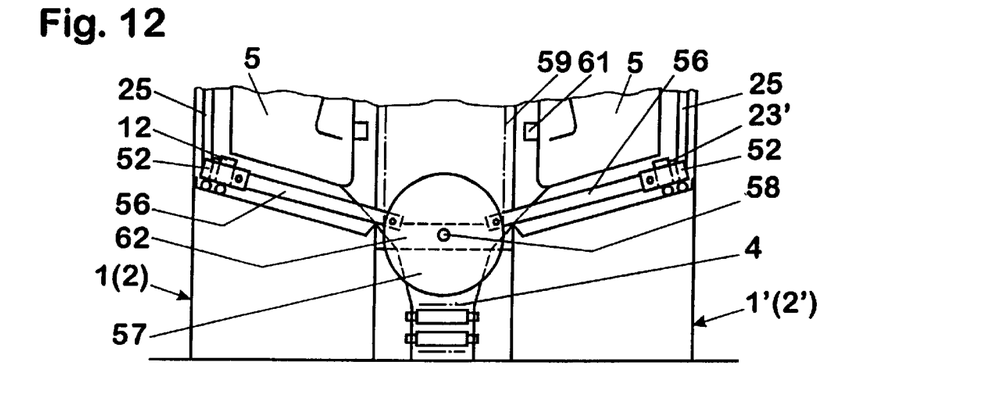
FIG. 12 shows a schematical side view of a particularly preferred embodiment of storage shelves arranged on either side of a conveying belt.
Figure 13:
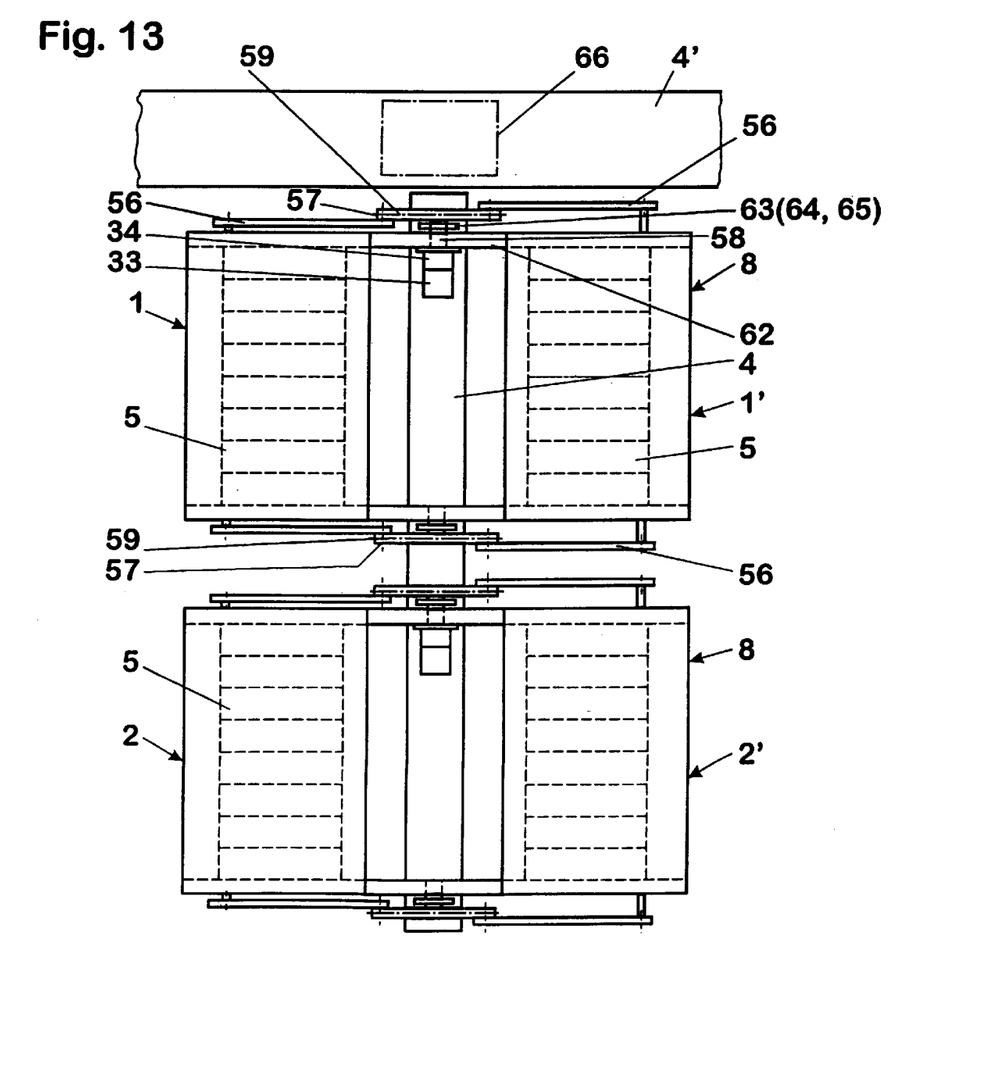
FIG. 13 shows a top view of the arrangement of storage shelves according to FIG. 10.

The arrangement of storage shelves illustrated in FIGS. 12 and 13 comprises storage shelves 1, 1' and 2, 2' arranged on either side of the conveying belt 4 to enable an efficient utilisation of the available space, wherein also , e.g., three or four storage shelves 1, 2 or 1', 2' can be arranged adjacently on either side. These storage shelves 1, 2; 1', 2' generally correspond to the embodiment according to FIG. 11, and the structural elements corresponding to those of the embodiment according to FIG. 11 are denoted by the same reference numerals. The carriages 52 of respective opposite storage shelves 1, 1'; 2, 2' here are each driven by a common crank disk 57 arranged in the middle between the storage shelves 1, 1'; 2, 2', via their associated connecting rods 56. The crank disks 57 are, e.g., mounted via shafts 58 in a web 62 interconnecting the frameworks 8 of the storage shelves 1, 1' and 2, 2'. As in the embodiment according to FIG. 11, the superposed crank disks 57 are coupled among each other by toothed belts 59. The shaft 58 of the uppermost crank disk 57 additionally comprises a toothed wheel 63 which, via a toothed belt 64, is coupled with a toothed wheel 65 of a drive motor 33 with gear 34. At each shift-out procedure, the crank disks 57 are each rotated by 360° so that a reversion of the rotational direction of the drive motor 33 is not required.

The discharged items then pass over the conveying belt 4, which, e.g., has the function of a collecting belt—yet, optionally also that of a central belt—to a conveying belt 4' arranged to follow the storage shelves 1, 1', optionally into a container 66 on the conveying belt 4', to be transported to a collecting site (not illustrated) thereafter. In case of an arrangement comprising merely three or four storage shelves 1,2 . . . ; 1', 2'. . . per side (so that a total length of e.g., 5 to 6 m is obtained) and a storage of "slowly turning" items, e.g. items belonging to only one comissioning order are respectively collected on the conveying belt 4, which may be stopped during this time (collecting belt function). It is, of course, also conceivable to use the conveying belt 4 as central belt, on which the items are heaped and transported in groups, corresponding to the commissioning orders.

Instead of the conveying belts 4 and 4', respectively, of course also other conveying techniques, such as roller paths, can be used.

What is claimed is:

1. A storage shelf (1, 2, 3) for items comprising adjacently arranged and superposed storage compartments (5) and a controllable dispensing device for shifting the items out of the storage compartments (5), the dispensing device including slider parts associated to the rows of adjacently arranged storage compartments (5) and movable in parallel to the compartment bottoms thereof, the slider parts cooperating with separately activatable drivers (13) associated to the individual storage compartments (5) of the respective row so as to shift the items out of the respective storage compartments (5) in the activated state of the drivers (13), when the slider parts are moved forwards, the drivers (13), in in their activated state, projecting upwardly from their slider parts movable below the bottoms (7) of the storage compartments (5), through slots (14) in the bottoms (7), while being present below the bottoms (7) in their non-activated state, characterized in that the superposed slider parts formed by beamlike cross members (10) are interconnected to a uniform, rigid, upright frame (25) drivable as a unit and, thus,are movable in common.

2. A storage shelf according to claim 1, characterized in that the cross members (10) are interconnected via lateral beams (24) to form the frame (25).

3. A storage shelf according to claim 1, characterized in that the frame (25) with the cross members (10*a*) is drivable by one working cylinder (48).

4. A storage shelf according to claim 2, characterized in that the frame (25) is connected with chain drives (27) the chain wheels (29, 30) of which are mounted in a framework (8) of the storage shelf via shafts (31, 32), the shafts (31, 32) being synchronously drivable.

5. A storage shelf according to claim 4, characterized in that the frame (25) is connected with the chain drives (27) in the region of the uppermost and lowermost cross members (10).

6. A storage shelf according to claim 1, characterized in that the cross members (10) are fastened to the ends of arms (38*a*, 38*b*, 38*c*) projecting from the frame (25) in the movement direction thereof.

7. A storage shelf according to claim 6, characterized in that at least some of the arms (38*a*, 38*c*), via rollers (42), are mounted in lateral guide rails (43) which are fastened in a framework (8) of the storage shelf.

8. A storage shelf according to claim 6, characterized in that toothed ledges (39) are provided on at least two arms (38*b*) and mesh with toothed wheels (40) which are fastened on a common shaft (41) which is mounted in the framework (8) and connected with a driving device (33).

9. A storage shelf according to claim 2, characterized in that the drivers (13) are connected with the cross members (10*a*) via arms (44), and additional arms (44') are attached to the frame (25) which carry rollers (50) at their ends, the rollers being mounted in guide rails (51) on a framework (8) of the storage shelf.

10. A storage shelf according to claim 9, characterized in that the frame (25), e.g. at approximately the middle of its height, is connected with working cylinders (48) fastened to the framework (8).

11. A storage shelf according to claim 1, characterized in that the cross members (10) of the frame (25) define carriages (52) with wheels (53) running in lateral guides (54).

12. A storage shelf according to claim 11, characterized in that at least the uppermost and the lowermost carriage (52) which are associated to one row each of adjacent storage compartments (5) are coupled with a crank disk (57) via a connecting rod (56), the shaft (58) of the crank disk being mounted in a framework (8) of the storage shelf.

13. A storage shelf according to claim 12, characterized in that the crank disks (57) of the carriages (52) are coupled among each other by toothed belts (59) and driven via one driving device (33).

14. A storage shelf according to claim 11, characterized in that the guides (54) and the storage compartments (5) are arranged to be slantedly downwardly inclined in the shift-out direction.

15. A storage shelf according to claim 1, characterized in that on at least one cross member (10) in the region of at least one driver (13), a sensor (23') monitoring the shift-out operation at the associated storage compartment (5) is arranged.

16. A storage shelf according to claim 15, characterized in that the sensor (23') is also adapted to sense whether the storage compartment (5) contains items (11) or is empty.

17. A storage shelf according to claim 15, characterized in that the sensor (23') is an optical sensor.

18. A storage shelf according to claim 1, characterized in that the drivers (13) are formed or driven, respectively, by extendable magnetic cores of solenoids (12) arranged on the cross members (10).

19. An arrangement comprising a plurality of storage shelves according to claim 12, characterized in that on either side of a conveying belt (4), opposite storage shelves (1, 1'; 2, 2') are provided and the carriages (52) of opposite storage shelves are driven via associated connecting rods (56) by a common crank disk (57) arranged between the storage shelves.

* * * * *